United States Patent [19]

Gfrerer et al.

[11] Patent Number: 5,782,499
[45] Date of Patent: Jul. 21, 1998

[54] CLAMP FOR JOINING TUBULAR PIPE SECTIONS

[75] Inventors: Heinrich Gfrerer, Urbach; Thomas Röder, Kirchberg; Otto Oster, Kirchardt, all of Germany

[73] Assignee: Mercedes-Benz AG, Stuttgart, Germany

[21] Appl. No.: 708,647

[22] Filed: Sep. 5, 1996

[30] Foreign Application Priority Data

Sep. 16, 1995 [DE] Germany .................. 195 34 437.5

[51] Int. Cl.⁶ .................................................. F16L 25/00
[52] U.S. Cl. ................ 285/23; 285/470; 285/252; 285/253
[58] Field of Search ................ 285/23, 420, 410, 285/409, 252, 253

[56] References Cited

U.S. PATENT DOCUMENTS

| | | | |
|---|---|---|---|
| 1,354,669 | 10/1920 | Levedahl | 285/115 |
| 2,406,478 | 8/1946 | Snyder | 285/115 |
| 2,457,077 | 12/1948 | Woolsey | 285/410 |
| 2,675,253 | 4/1954 | Stadt | 281/410 |
| 2,937,893 | 5/1960 | Hill et al. | 285/410 |
| 3,059,947 | 10/1962 | Felburg et al. | 285/410 |
| 3,669,474 | 6/1972 | Bode | |
| 3,822,075 | 7/1974 | Duncan | |
| 3,889,984 | 6/1975 | Lambris | 285/420 |
| 4,372,017 | 2/1983 | Heckethorn | 285/420 |
| 4,708,377 | 11/1987 | Hunting | |
| 4,969,923 | 11/1990 | Feeder et al. | 285/420 |

FOREIGN PATENT DOCUMENTS

| | | |
|---|---|---|
| 0 390 057 | 10/1990 | European Pat. Off. . |
| 0 403 379 | 12/1990 | European Pat. Off. . |
| 2 335 119 | 3/1974 | Germany . |
| 26 14 477 | 10/1977 | Germany . |
| 610 441 | 10/1948 | United Kingdom . |
| 843 229 | 8/1960 | United Kingdom . |
| 1 371 249 | 10/1974 | United Kingdom . |

*Primary Examiner*—Eric K. Nicholson
*Attorney, Agent, or Firm*—Klaus J. Bach

[57] ABSTRACT

In a pipe jointure for joining pipe sections, particularly of exhaust systems of motor vehicles including a clamp having opposite leg portions with clamping surfaces for enclosing and firmly engaging adjacent ends of the pipe sections, at least one of the leg portions has radially inwardly and axially outwardly directed tabs extending therefrom in circumferentially spaced relationship for retaining and guiding the adjacent pipe sections while the clamp is mounted and tightened by compressing bolts.

6 Claims, 3 Drawing Sheets

5,782,499

CLAMP FOR JOINING TUBULAR PIPE SECTIONS

BACKGROUND OF THE INVENTION

The invention relates to a clamp for joining two pipe section, particularly of exhaust systems of motor vehicles, wherein the clamp has clamping surfaces for holding two adjacent surface areas of the pipe sections to be joined in firm engagement with each other.

EP 0 403 379 A1 discloses a clamp for interconnecting the ends of two pipes with a U-shaped clamp body having legs whose ends are provided with outwardly projecting flanges which are joined by a bolt. One of the flanges has an opening through which the bolt extends and is threaded into a threaded opening in the other flange. At its inner side, the clamp body has circumferentially spaced recesses which act as hinge structures.

For general technical background reference is further made to EP 0 390 057 and DE 23 35 119A.

The clamps as known in the art however are often difficult to mount since the pipe sections to be joined are often not properly aligned so that they can be accurately positioned and enclosed by the clamp.

It is therefore the object of the present invention to provide a clamp which substantially facilitates mounting to join two adjacent pipe sections.

SUMMARY OF THE INVENTION

In a clamp for joining pipe sections, particularly of exhaust systems of motor vehicles wherein the clamp has opposite leg portions with clamping surfaces for enclosing and firmly engaging adjacent ends of the pipe sections, at least one of the leg portions has radially inwardly directed tabs extending therefrom in circumferentially spaced relationship for retaining and guiding the adjacent pipe sections while the clamp is mounted and tightened by compressing means.

With the tabs distributed over the inner circumferential edges of the clamp so as to extend therefrom radially inwardly and axially outwardly, the mounting of the clamp is facilitated as the ends of the pipe sections to be joined are pulled by the tabs into their proper positions relative to one another before the clamp is tightened. When being mounted the opened clamp is first placed around the ends of the pipe sections to be joined and it is then partially folded together. Since the pipe sections are not exactly flush with one another the clamp engages the ends of the pipe sections with only part of its circumferential engagement surface. During full closing of the clamp, the pipe tabs guide the pipe sections into proper positions so that the two pipe sections are properly positioned when the clamp is closed. Consequently, the tabs provide for optimal positioning and an improved connection between the engagement surfaces of the pipe sections to be joined. In addition, the tabs prevent cogging of the clamp and the pipe sections during assembly.

If the clamp has a U-shaped cross-section whereby both legs of the U-profile are slanted outwardly in the direction of the pipe axis and the engagement surfaces are formed by the two inside surfaces of the two legs the clamp provides for a well defined stable reception for the two ends of the pipe sections and also facilitate assembly of the clamp with the pipe sections since the U-profile is conically widened and for example conically shaped ends of pipe sections can be more easily joined. Furthermore, the U-profile provides for high resistance to deformation while the bolt joining the ends of the clamp is tightened.

If the tabs on the clamp have axially outwardly directed end sections which have a smaller inclination with respect to the clamp or pipe axis at their end than the tabs have at their radially inner ends adjacent the clamp body, assembly of the clamp is even further facilitated since those areas prevent closing of the clamp while the pipe ends are not sufficiently well positioned so that the portions of the tabs and of the clamp with greater inclination cannot properly engage and guide the pipe ends into proper positions relative to one another.

If the clamp is provided with a projection which engages a stop formed on one of the pipe sections the clamp is held in proper position during assembly whereby assembly is further facilitated.

If the flange has at its radially inner end circumferentially spaced cut-outs, assembly and manufacturing of the clamp is still further facilitated. On one hand, these cut-outs define certain bending locations and provide for tolerance equalization when the clamp is placed into position onto the adjacent ends of the pipe sections in such a way that neither the clamp nor the pipe sections are deformed in an unwanted manner. On the other hand, the cut-outs facilitate manufacturing of the clamp since bending of the U-shaped material into an annular shape is facilitated.

Preferably, the pipe sections have conically shaped ends which correspond to the conical ends of the pipe sections so that the clamp can join the pipe ends more easily and properly.

The invention will be described below on the basis of the accompanying drawings.

DESCRIPTION OF A PREFERRED EMBODIMENT

Figure 1:
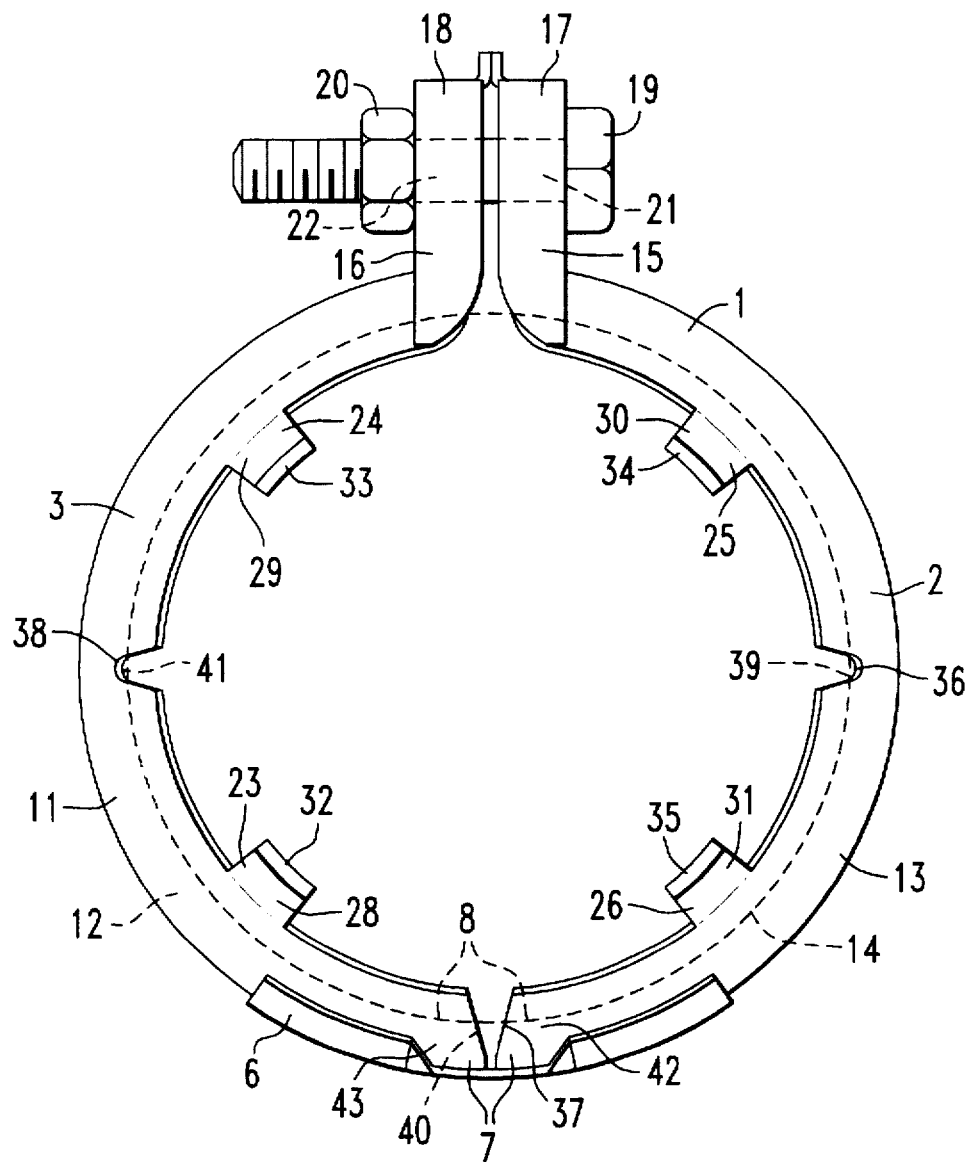
FIG. 1 is a front view of a clamp according to the invention with two clamp halves of U-shaped cross-section wherein two halves are joined by a bolt.
Figure 2:
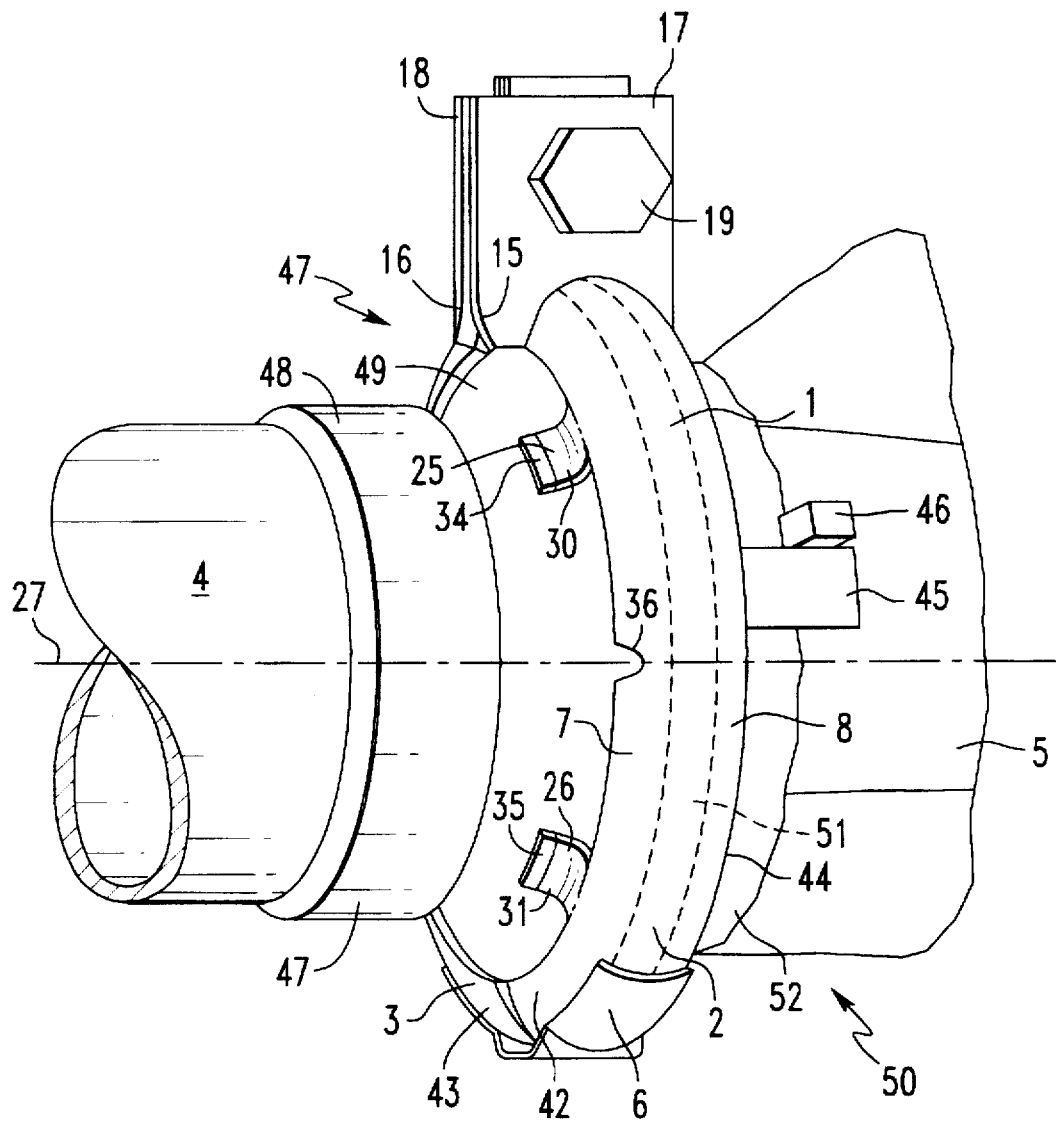
FIG. 2 shows two pipe sections joined by the clamp.

FIG. 1 is a front view of a two-part clamp 1 comprising two clamp halves 2, 3 for joining two tubular pipe sections 4, 5 (See FIG. 2). The clamp halves 2, 3 are interconnected by a hinge 6 which, in this case, is a metal strap. The clamp 1 has a U-shaped cross-section with two legs 7, 8 providing clamping surfaces 9, 10 (see FIG. 3), the legs 7, 8 each comprising two leg halves 11 to 14.

The ends 15, 16 of the clamp 1 include clamping structures which, as shown in FIG. 1, are outwardly bent flange end portions 17, 18, which are pulled together, in a well known manner, by a bolt 19 and a nut 20 screwed thereon. Preferably, one flange end portion has an opening 21 with an internal thread into which the bolt 19 is threaded to hold the bolt 19 in place and the other flange end portion 18 has an elongated hole 22 through which the bolt 19 passes. In this manner, the clamp 1 can be easily tightened by the nut 20 being screwed onto the bolt 19.

In order to facilitate mounting of the clamp 1, the leg 7 is provided with circumferentially spaced radially inwardly directed tabs 24 to 26 which are rectangular or in the form of a circle section and which are adapted to engage the pipe section 4 (see FIG. 2). The tabs 23 to 26 each have two outwardly inclined areas 28 to 35, the radially inner areas 28 to 35 having a greater inclination with respect to the longitudinal axis 27 of the pipe than the radial outer areas 28 to 31.

The clamp 1 is provided at each of the legs 7, 8 at the radial inner edge with three circumferentially spaced radial cutouts 36–38 and 39 to 41, the two cutouts 36, 38 and 39 41 having the shape of a U. The third cutouts 37 and 40 form at the same time the separation gap between the clamp halves 2, 3 and are disposed diametrically opposite from the two end portion 17 and 18. They are formed by an inclined cut of the ends 42, 43 of the clamp halves which are interconnected by the hinge strap 6 welded to the clamp halves and therefore have the shape of a V. The tabs can be distributed over the circumference of the clamp in any way. There may be, for example, two tabs at opposite sides of the V-shaped cut-out in such a way that the cut-out is extended by the tabs to provide an extended V-shaped form.

Figure 3:
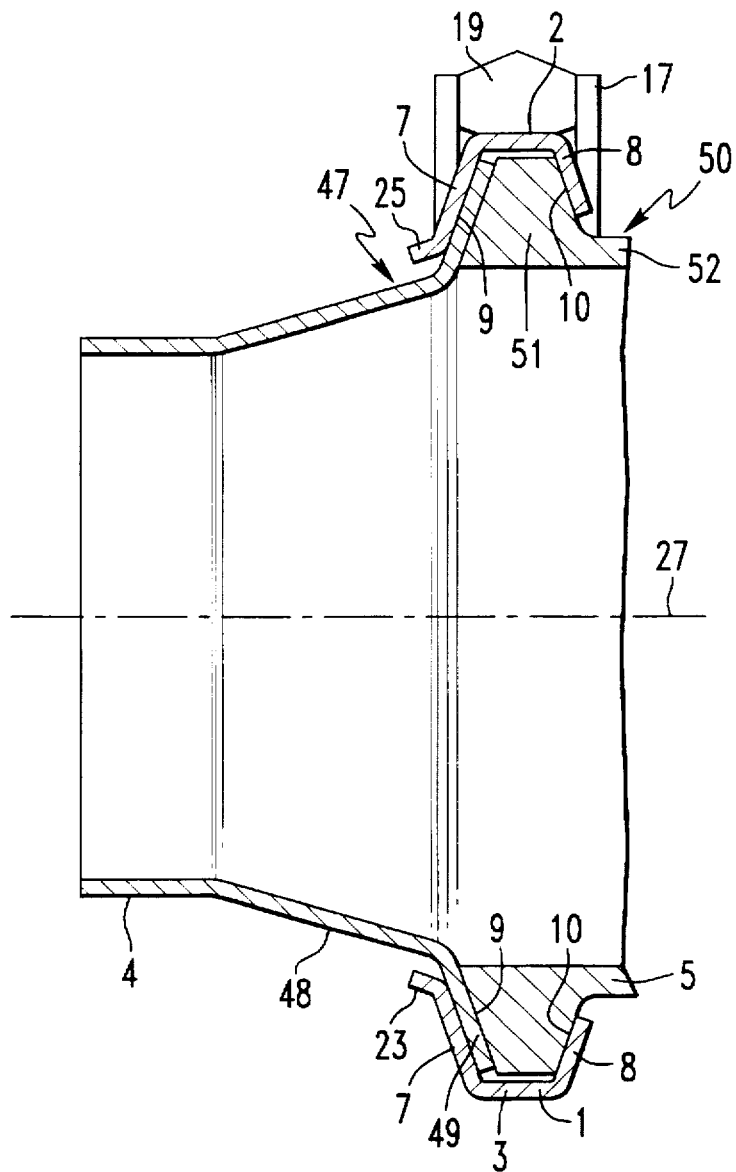
FIG. 3 is an axial cross-sectional view of a pipe joint made the clamp.

FIGS. 2 and 3 show the two pipe ends 4 and 5 interconnected by the clamp 1, which encloses the two adjacent ends 47, 50 of the two pipe sections 4, 5. At a front side 44, the clamp 1 includes an oblong projection 45 which is engaged by a stop 46 of the pipe section 5. In FIGS. 2 and 3 the same components are indicated by the same numerals as in FIG. 1.

FIG. 3 is an axial cross-sectional view showing a clamp mounted so as to join two pipe sections wherein the cross-sectional plane extends through two tabs 23, 25 of the clamp 1.

The clamping surfaces 9, 10 of the clamp 1 are formed by the two outwardly inclined legs 7, 8 of the U profile of the clamp.

The pipe section 4 of the two pipe sections 4, 5 has at its end 47 a slightly conical portion 48 which leads to a highly conical end area 49. The end 50 of the other pipe section 5 includes a conical adapter ring 51 of a trapezoidal cross-section at the end of a cylindrical pipe portion 52 of the pipe section 5. The end 47 of the pipe section 4 abuts with its highly conical end area 49, the conical adapter ring 51. The two ends 47, 50 of the pipe sections are firmly engaged by the clamping surfaces 9, 10 of the clamp 1.

In place of a metal strap other suitable means may serve as a hinge between the two clamp halves. Instead of a bolt for forcing the two clamp halves together other mounting means such as a spring clamp may be utilized. Instead of an elongated hole the end portion 18 may be provided with a thread whereby the nut 20 may be omitted. It is also possible to provide a single piece clamp. Also the number of tabs can be selected as desired. Generally, there is also no need for the slightly conical portion 48 of the pipe section 4 so that the highly conical section 49 extends directly from the cylindrical portion of the pipe section 4. Instead of the engagement surfaces bering conical, the engagement surfaces may be spherical cooperating with spherical surfaces on the clamp.

The clamp is mainly designed for joining the exhaust pipe and/or the charge air pipe with an exhaust gas turbo-charger.

What is claimed is:

1. A pipe jointure for pipe end sections having conical end flanges, particularly of exhaust systems of motor vehicles, said pipe jointure including a clamp having opposite leg portions with clamping surfaces enclosing and firmly engaging adjacent conical end flanges of said pipe sections, and means for compressing said clamp for clamping said pipe sections together, at least one of said leg portions of said clamp having radially inwardly and axially outwardly directed tabs formed thereon in circumferentially spaced relationship which extend at least one of the clamping surfaces for engaging an adjacent pipe section end flange during mounting of the clamp, said tabs each including at least two outwardly inclined areas, a radially outer area and a radially inner area which has a greater inclination than said radially outer area which is joined to said leg portion.

2. A clamp according to claim 1, wherein said pipe jointure has a U-shaped cross-section and said opposite leg portions are inclined outwardly in axial direction of said clamp and said clamping surfaces are disposed at opposite inner sides of said opposite leg portions, said tabs extending said clamping surfaces.

3. A pipe jointure according to claim 1, wherein said clamp has an axial projection for engagement with a stop formed on a pipe section for properly locating and retaining said clamp with respect to said pipe section.

4. A pipe jointure according to claim 1, wherein said clamp comprises two clamp halves which are joined by a hinge portion.

5. A pipe jointure according to claim 1, wherein said clamp has radial cutouts formed in its opposite leg portions in circumferentially spaced relationship.

6. A pipe jointure for pipe end sections having conical end flanges, particularly of exhaust systems of motor vehicles, said pipe jointure including a clamp having opposite leg portions with clamping surfaces enclosing and firmly engaging adjacent conical end flanges of said pipe sections, and means for compressing said clamp for clamping said pipe sections together, at least one of said leg portions of said clamp having radially inwardly and axially outwardly directed tabs formed thereon in circumferentially spaced relationship which extend the clamping surfaces for engaging an adjacent pipe section end flange during mounting of the clamp, said clamp having an axial projection for engagement with a stop formed on a pipe section for properly locating and retaining said clamp with respect to said pipe section.

* * * * *